United States Patent [19]

Baldwin et al.

[11] Patent Number: 5,515,123
[45] Date of Patent: May 7, 1996

[54] CONDENSERS FOR ILLUMINATION SYSTEMS

[75] Inventors: Dwight G. Baldwin; Stephen K. Eckhardt, both of Austin, Tex.

[73] Assignee: Minnesota Mining and Manufacturing Company, St. Paul, Minn.

[21] Appl. No.: 197,613

[22] Filed: Feb. 17, 1994

[51] Int. Cl.$^6$ .................................................. G03B 21/14
[52] U.S. Cl. ........................................... 353/102; 362/335
[58] Field of Search ........................... 353/102, 38, 101; 362/311, 326, 335

[56] References Cited

U.S. PATENT DOCUMENTS

| | | | |
|---|---|---|---|
| 934,579 | 9/1909 | Straubel et al. | |
| 1,507,212 | 9/1924 | Silberstein et al. | |
| 1,615,674 | 1/1927 | Beechlyn . | |
| 1,946,088 | 2/1934 | Maurer, Jr. | 88/24 |
| 2,587,956 | 3/1952 | Bastien | 240/2 |
| 4,327,972 | 5/1982 | Brunsting | 362/335 |
| 4,609,978 | 9/1986 | Hsieh et al. | 362/335 |
| 4,741,613 | 5/1988 | Vanderwerf | 353/102 |
| 5,317,349 | 5/1994 | Vanderwerf | 353/102 |
| 5,400,094 | 3/1995 | Eckhardt | 353/102 |

FOREIGN PATENT DOCUMENTS

| | | |
|---|---|---|
| 299475 | 1/1989 | European Pat. Off. . |
| 304666 | 3/1989 | European Pat. Off. . |
| 92/22008 | 6/1991 | WIPO . |

*Primary Examiner*—William C. Dowling
*Attorney, Agent, or Firm*—Gary L. Griswold; Walter N. Kirn; Jack V. Musgrove

[57] ABSTRACT

A condenser lens for a projection system optimizes the amount of overall brightness directed toward an aperture and the uniformity of illumination at the aperture. The lens, when placed in the projection system, has a marginal ray which starts at the center of the light source, passes through the edge of the condenser lens, and intersects the region to be illuminated at or near its edge. The lens further has a relative zonal ray height which is selected based on the distance from the light source to the aperture. The condensing lens system is particularly useful in the construction of overhead projectors.

20 Claims, 3 Drawing Sheets

CONDENSERS FOR ILLUMINATION SYSTEMS

BACKGROUND OF THE INVENTION

1. Field of the Invention

The present invention generally relates to optical illumination systems in which a condensing lens is used, and more particularly to an illumination system for an overhead projector, which is constructed to maximize the amount of illumination over any desired region or aperture for a given optical geometry.

2. Description of the Prior Art

Condenser lenses for optical illumination systems are commonly used to collect light from a source and direct it toward a region or aperture to be illuminated. Such lenses may include single or multiple elements designed in bi-convex, plano-convex and meniscus shapes. One common use of condensing lens systems is in overhead projectors (OHP's).

A conventional OHP generally comprises a base having a light source, a stage area and a projection head located above the stage. The light source often consists of either a reflectorized lamp or a lamp which has no reflector in combination with a separate reflector and possibly a condenser lens. The Fresnel lens at the stage gathers the light and directs it to the projection lens in the head, which projects any transparent image placed on the stage.

It is desirable to provide as bright an image as possible in order to ensure that it is adequately visible in light environments. Brightness has become particularly important with the increasing use of liquid crystal display (LCD) panels in conjunction with OHP's, since the transmission of an LCD panel is typically very low.

Uniformity of illumination is also important. Although the human eye is not very sensitive to gradual changes in illuminance, changes of more than a factor of about four from the center of the screen to the remote corners are discernable. Uniformity is usually measured according to ANSI/ISO 9767-1990, which defines it in terms of a corner-to-center ratio. A corner-to-center ratio of greater than 40% is considered very good for an OHP according to the Japanese standard, JIS B 7160, which is essentially identical to the ANSI definition of corner-to-center ratio.

Three important factors involved in achieving high stage illumination are: lamp construction, collection of the light from the lamp, and utilization of the light once it has been collected. The first factor involves the lamp itself while the other two factors are dependent on the performance of the condenser lens or lenses. Lamp construction can be varied in several ways to yield increased illumination. Conventional OHP lamps are either incandescent or arc discharge. An incandescent lamp is generally lower in cost than an arc discharge lamp, and therefore is more widely used in overhead projectors, although arc lamps can provide higher illumination. If an incandescent lamp is chosen, the only available means by which the illumination can be increased is to use one with a higher wattage. Wattage is still limited since other components of the projector may become overheated. For example, if the Fresnel lens/stage becomes too hot, it can distort the image bearing film.

With respect to the other illumination factors, the collection and utilization of the light may best be achieved with an appropriate condensing lens system. A condenser lens can be constructed to collect as much of the light from the lamp as possible and direct it through the stage. The amount of light collected by the condenser lens is governed by its collection angle, which is defined as the angle between two rays, one passing through the upper edge of the collection system and the other passing through the lower edge. This angle is affected by the distance from the filament of the light source to the closest side of the condenser lens. The condenser lens is generally placed as close to the lamp as is practicable, so the only other factor involved is the diameter of the condenser lens. Increasing the diameter automatically increases the collection angle, but this too has a limit since it also tends to increase the thickness of the condenser lens in the process, thereby increasing its cost and susceptibility to thermal stress. Therefore, a balance between the diameter of the lens with its thickness to give high collection efficiency is needed. There are a number of patents in the art which discuss the amount of light collected by a condenser system.

The main function of a condenser is to collect light from a source and aim it toward the region or aperture to be illuminated. In the prior art, the amount of light collected by the condenser system is described by its relative aperture (U.S. Pat. No. 934,579), numerical aperture (cf. U.S. Pat. No. 2,637,242) or collection angle (cf. U.S. Pat. Nos. 1,615,674, 1,946,088 and 2,587,956). The collection angle is defined as the angle between two rays, one passing through the upper edge of the collection system and the other passing through the lower edge.

One common feature in condenser designs is that the system is aplanatic, that is, corrected for spherical aberration and coma (cf. U.S. Pat. No. 934,579 and 1,507,212). Aplanatism is especially desirable in illumination systems for high resolution optical systems such as microscope illuminators. The need for correction of coma is decreased for lower resolution systems and may be intentionally avoided as in U.S. Pat. No. 2,637,242. Another common feature is that all condenser systems attempt to achieve some measure of uniformity of illumination (cf. U.S. Pat. Nos. 2,637,242 and 5,010,465). Ideally, the designer should be able to specify the uniformity produced by the condenser. It would, therefore, be desirable and advantageous to devise a single element condenser lens which increases illuminance in illumination systems without increasing the size and thickness of the condenser lens, and yet still maintains high uniformity of the projected light.

SUMMARY OF THE INVENTION

The present invention provides a condensing lens system comprising a biconvex, plano-convex or meniscus shaped lens, wherein the lens is designed to maximize the amount of illumination over any desired region or aperture for a given lamp, when used in a given illumination system. Furthermore, high uniformity of the illumination is achieved. Specifically, these lenses are constructed to possess a pupil distortion (pincushion or barrel) which is appropriate for the distance from the light source (filament) to the projection aperture in a given illumination system. In each of these designs, a ray which passes through the edge of the condenser lens is aimed at a point slightly beyond the border of the region it is to illuminate.

This invention is particularly useful in OHP's to provide an optimum amount of illumination over the entire stage area, while maintaining high uniformity, i.e., corner-to-center ratio. The condenser lens of the present invention can be used without correcting for spherical aberration or coma. These aberrations can be corrected by additional elements in the illumination system if such correction is desired.

BRIEF DESCRIPTION OF THE DRAWINGS

The invention will best be understood by reference to the accompanying drawings, wherein.

DESCRIPTION OF THE PREFERRED EMBODIMENT

Figure 1:
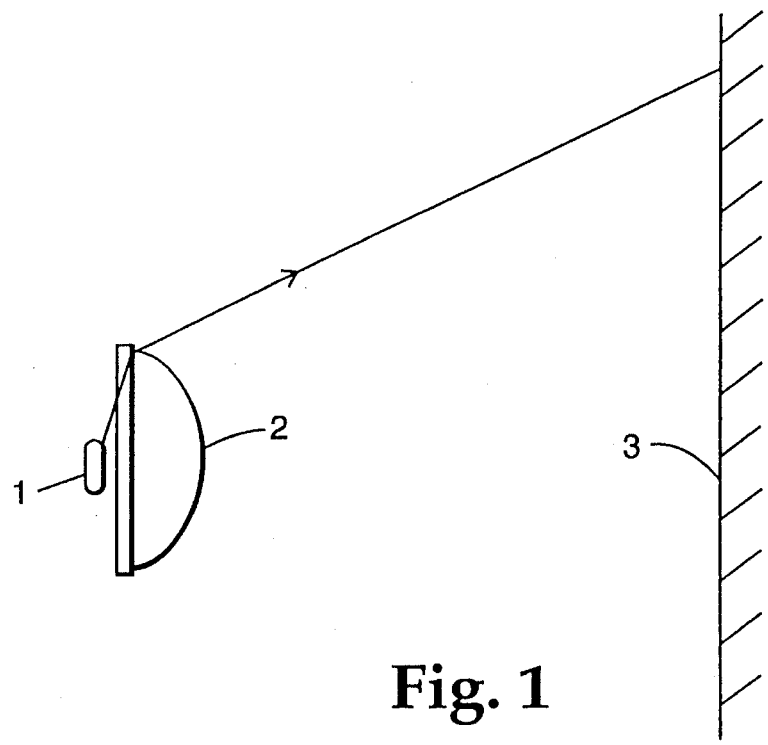
FIG. 1 is a side elevational view of a generalized optical illumination system constructed in accordance with the present invention.

With reference now to the figures, and in particular with reference to FIG. 1, there is depicted a generalized optical illumination system constructed in accordance with the present invention. The illumination system is generally comprised of a light source or filament 1, a condensing lens 2, and an aperture or region to be illuminated 3. As discussed further below, the present invention is particularly useful in the design of overhead projectors (OHP's), but this should not be construed in a limiting sense, as the present invention is also useful in other optical illumination systems, such as contact printing.

The condenser lenses of the present invention are constructed to maximize the amount of illumination over a given region or aperture for a given lamp and optical geometry. This is done by utilizing substantially all of the condenser lens surface for light collection, i.e., by maximizing the solid angle subtended by the area to be illuminated as seen from the lamp. There are two main factors which determine the design of a condenser lens. These design factors can be described with respect to an axially symmetric optical system, though it also applies to asymmetric optical systems.

The first design factor can be described with reference to the entrance pupil of the condenser lens, defined as the image of the limiting aperture of the condenser lens as seen from the filament. A ray A starting at the center of the source and passing through the edge of the entrance pupil intersects the region to be illuminated at or near its extremity (i.e., a corner of a polygonal aperture), allowing for the extended nature of the source and manufacturing tolerances. Such a ray is known as the "marginal ray." The distance from the center of the aperture to the point where the marginal ray intersects the aperture may be referred to as the cone radius. The first design factor ensures that the cone of light exiting the condenser does not illuminate an area substantially larger than necessary.

The second design factor ensures that the entrance pupil height of a ray intersecting the region to be illuminated at 0.7071 of the cone radius is maximized. This ray is known as the "zonal ray." When illuminating a rectangular aperture, such as the stage area of an OHP, this second design factor becomes important, as it affects the overall illuminance of the stage area. It also has an effect on the uniformity, but this effect is weaker.

It is helpful to define pupil distortion for condensers in term of the zonal and marginal rays. If the image of a square stage appears as a square in the pupil of the condenser, there is no distortion. In terms of the two rays, this means that a ray which intersects the stage at 70.71% of the distance from the axis to the intersection point of the marginal ray will intersect the pupil at 70.71% of the marginal ray height. This corresponds to a relative zonal ray height in the pupil of 0.7071. The distortion is then defined as:

$$\text{distortion} = 100 * (\text{zonal} - 0.7071) / 0.7071,$$

where "zonal" is the relative pupil height of the zonal ray, and the distortion has been converted to a percentage. This pupil distortion is not to be confused with image distortion, which can only be measured at an image plane.

Figure 2A:
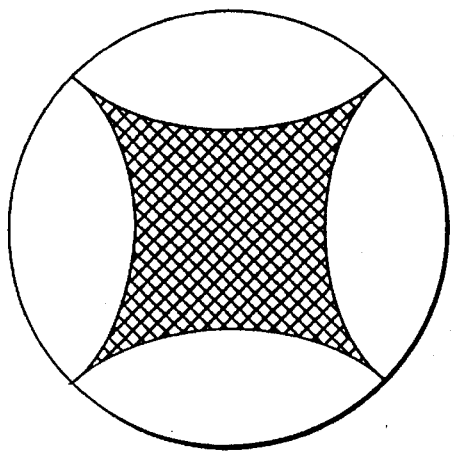
FIGS. 2A–2C are bottom plan views of the condenser lenses made in accordance with the present invention, illustrating pupil distortion.
Figure 2C:
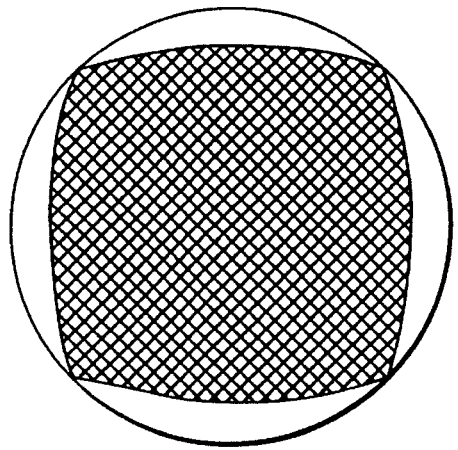
Figure 2B:
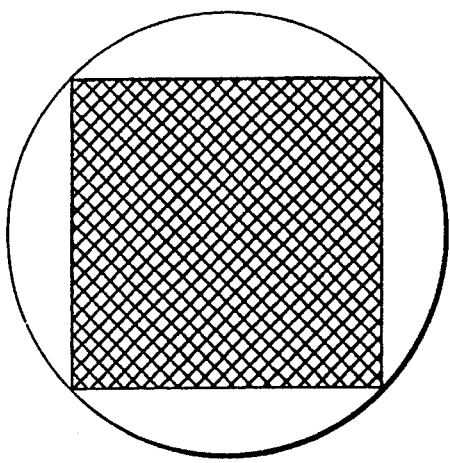

These two design factors may be understood with reference to FIGS. 2A–2C. If it were possible for the human eye to focus on the border of a square region to be illuminated through a condenser that satisfies only the first design factor, it would appear as in FIG. 2A. The square border has been distorted into a "pincushion" shape by the refracting power of the condenser. This can be verified by ray tracing; the relative zonal ray height for pincushion distortion will be <0.7071. In general, the stronger the condensing power of the lens, the greater the amount of pincushion distortion. A lens constructed in accordance with the present invention may have such pincushion distortion if the optical path length is relatively small, but the pincushion distortion is still less than that found in prior art illumination systems, as explained further below in conjunction with FIG. 3. If the optical path length is slightly longer, lens 2 may be constructed without any distortion (i.e., zero distortion), as shown in FIG. 2B. Finally, in cases where the optical path length is relatively long, the lens will have "barrel" distortion, as shown in FIG. 2C. In this case, the relative zonal ray height will be >0.7071. The present invention contemplates both straight-through and folded optical paths, so the optical path length in a folded system refers to the length along the folded path.

The importance of this image of the border as seen from the filament position is that it defines the solid angle subtended by the region to be illuminated. This quantity enters into the calculation of the total luminous flux impinging on the region or aperture. The total luminous flux incident on the region is the product of the area of the source, the luminance of the source and the solid angle subtended by the region as seen from the source. In other words, the physical size and geometrical collection angle of the condenser system are insufficient to predict the luminous flux impinging on the illuminated area; refraction of the cone of light entering the condenser is also important. Increasing the solid angle of the image of the illuminated region, as seen from the filament, increases the luminous flux incident on the region.

From this viewpoint, the first design factor assures that the corners of the border, as seen through the condenser, are near the edge of the entrance pupil. The second factor forces the edges of the apparent border to be as close to the edges of the entrance pupil as is practical. Because the area within the apparent border normally does not exceed the area of the condenser, using these two design factors to force the area within the apparent border to approach the area of the condenser maximizes the collection efficiency of the condenser.

Figure 3:
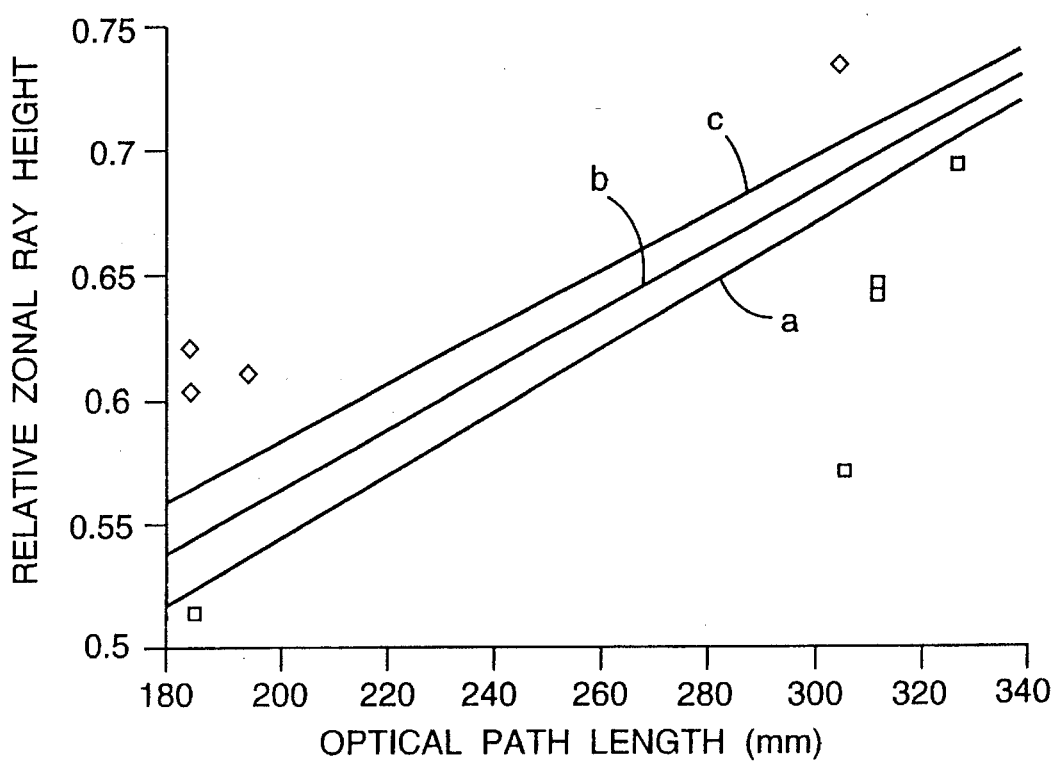
FIG. 3 is a graph depicting the relationship between relative zonal ray height of the condensing lens and the optical path length of the illumination system.

FIG. 3 is a graph which illustrates the dependency of relative zonal ray height on the optical path length. The small squares represent relative zonal ray height values based on prior art illumination systems, while the diamonds represent relative zonal ray height values selected in accordance with the present invention. An examination of this graph reveals that the prior art does not recognize or appreciate the importance of zonal ray height in optimizing illuminance versus uniformity of illumination in illumination systems. For a given optical path length, the present invention requires a larger relative zonal ray height when compared to the prior art. More specifically, the minimum relative zonal ray height Z required by the present invention is defined by the following equation:

$$Z \geq (0.00122 \times L) + 0.301,$$

where L is the optical path length (the distance from the light source to the aperture) in millimeters. This equation is represented by the straight line a in FIG. 3. Alternatively, the relative zonal ray height may be greater than or equal to $(0.00115 \times L) + 0.333$ (line b in FIG. 3), or greater than or equal to $(0.00109 \times L) + 0.364$ (line c in FIG. 3).

While the two design factors maximize the collection efficiency of a condenser lens, its design can further be influenced by the consideration of uniformity of illumination within the region to be illuminated. U.S. Pat. No. 2,637,242 describes a method for designing a condenser with prescribed uniformity and correction for spherical aberration, thus producing a lens with any desired illumination profile. Specifically, it is stated that for an aplanatic condenser, the illumination falls off as the fourth power of the cosine of the angle between the optical axis and any given ray from the filament to the condenser. Although this method is presumed to work, it is quite complicated.

A simpler, though less precise, method of controlling the illumination profile can also be used, such as adjusting the vertex curvature of the condenser. Reducing the curvature (i.e. increasing the radius) makes the illumination profile more uniform, while increasing the curvature makes the profile more peaked in the center. Although this method is imprecise, the human eye is even less precise. The eye is not bothered by a corner-to-center ratio of >25%. Adjusting the curvature of the condenser is sufficient to control the falloff to within 10% of this target. Additional work, along the lines mentioned in U.S. Pat. No. 2,637,242, could be used to provide more precise control of uniformity in situations where that is considered necessary.

In addition to the corner-to-center ratio specified in the ANSI and JIS standards, it is necessary to provide sufficient illuminance for the furthest reaches of the stage (the corner-to-center ratio is measured at a point only two-thirds of the way to the furthest reaches according to the ANSI and JIS standards). Experimentation has shown that the furthest reaches must have an illuminance of 20%–30% as great as the center illuminance, or else they will be perceived as dark. It is necessary to adjust the shape of the condenser lens to accommodate this requirement.

Condensers designed to fulfill the two design factors are applicable to at least two types of illumination systems. In the first of these types, it is unnecessary to correct the aberrations introduced by the condenser, since no image of the light source is needed. Prominent examples of this type of application include, but are not limited to contact printing and illumination for inspection. In the second type, these aberrations are corrected by an additional optical element. Examples of the second types include, but are not limited to, illumination systems requiring an image of the light source, either in the vicinity of the object to be illuminated, such as critical illumination, or at the entrance pupil of the projection lens, such as Kohler illumination. In Kohler illumination systems, a field lens in the vicinity of the illuminated object can be used to correct the aberrations; whereas for a critical illumination system, correction for aberrations needs to be balanced with maximizing illumination for optimization. Multiple aspheric surfaces and/or multiple elements may be necessary.

Figure 4:
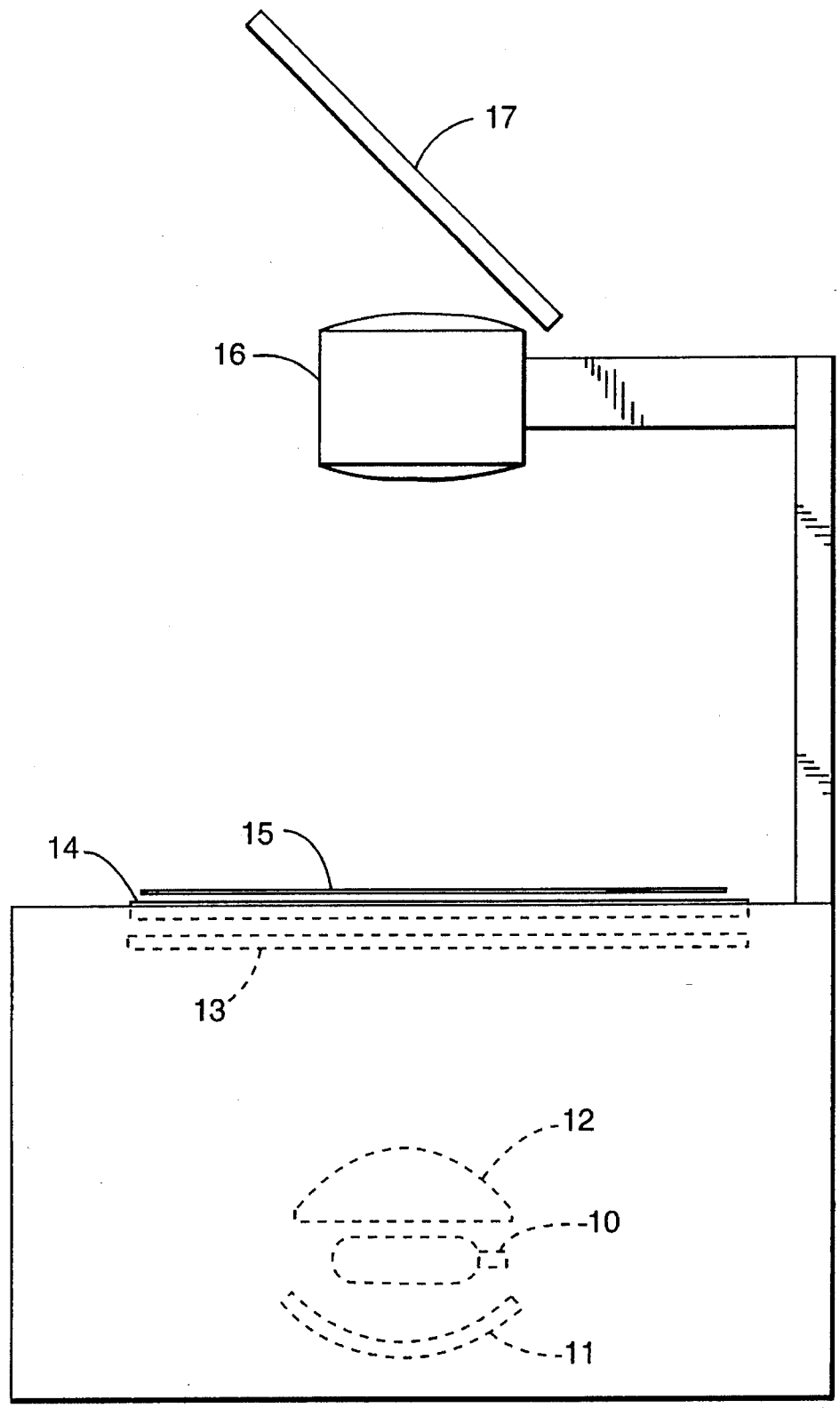
FIG. 4 is a schematic of a condenser as used in an overhead projector.

One specific application for condenser lenses of the present invention is in an overhead projector, as illustrated in FIG. 4. Light from a lamp 10 emanates in all directions. Some of this light impinges on a reflector 11 and is reflected back substantially toward the filament and thence toward the condenser 12. This reflected light, as well as the light initially emitted in the direction of the condenser, is collected by the condenser and refracted substantially toward the Fresnel lens 13. This Fresnel lens is usually a square, possibly with clipped corners, and the cone of light from the condenser is substantially circular. The cross-sectional diameter of the cone as it intersects the Fresnel lens is often designed to be equal or greater than the diagonal dimension of the Fresnel lens. From this one may infer that the light beam is clipped by the Fresnel lens and not all of the light gets through. The effect of the present invention is that the maximum amount of light passes through the Fresnel lens, for a given size of Fresnel lens.

The Fresnel lens refracts the beam of light so that it passes through the stage glass 14, the transparent object (film) 15 to be projected, and the projection lens 16. After being refracted by the projection lens, the beam is reflected by the head mirror 17 and illuminates the projection screen (not shown). In this case, the "aperture" of the system is the Fresnel lens/stage. It is clear that maximizing the amount of light passing through the Fresnel lens will also maximize the brightness of the image on the screen in a properly designed OHP system.

To design this type of condenser lens, one begins with the specification of the region to be illuminated and the distance from the lamp to this region. Next the distance from the lamp to the condenser and the condenser's diameter are chosen. Then the form of the condenser, whether biconvex, plano-convex or meniscus is prescribed. The radius on the side of condenser closest to the lamp can be chosen almost arbitrarily, though making the surface concave toward the lamp tends to increase the illumination uniformity and square the border image. The other constraint on this radius is that if it is too concave and the power required of the condenser is large, it might not be possible to obtain sufficient refracting power from the surface farther from the lamp. A curvature is specified for the surface farther from the lamp according to the desired uniformity. If no other rule of thumb is available, a starting point for this surface is a parabola with a vertex radius equal to the distance from the filament to the surface. Finally, a commercially available lens design program (e.g., the ZEMAX Optical Design Program from Focusoft, Inc., of Pleasanton, Calif.) can be employed to optimize the aspheric coefficients of the condenser in accordance with the two design rules. The appropriate relative zonal ray height can be determined from FIG. 3. To assure that the extreme corners are sufficiently illuminated it may be necessary to try several different designs. If the design is to be a spherical meniscus, it may be necessary to try several different bendings to achieve the required profile, even though this may require a deviation from the preferred relative zonal ray height. For an aspheric condenser, the preferred relative zonal ray height can be maintained, but several condensers with different aspheric coefficients can provide differing illumination profiles. Varying the highest order aspheric coefficient by a factor of two usually provides a sufficiently different illumination profile so that a trend is discernable. The trend can be followed (interpolated or extrapolated) to the optimum profile.

An example of a condenser for an overhead projector is given. The projector uses a lamp with an outside diameter of 18 mm, so the distance from the filament to the condenser is set at 11 mm, to allow for tolerances and a mounting bracket. This yields a collection angle of 140°. Acceptable collection angles are generally greater than or equal to 110°. The distance from the filament to the Fresnel lens is 184 mm. A sixty millimeter diameter, plano-convex aspheric condenser lens is used, and the edge thickness is constrained at 3 mm. The lens diameter could be in the range of 25–100 mm. Its vertex curvature is 0.0167, conic constant is 1.121, sixth order aspheric coefficient is $-9.29\times10^{-10}$ and eighth order aspheric coefficient is $-8.88\times10^{-13}$.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. An optical illumination system comprising:

a condenser lens;

a light source adjacent said condenser lens; and an aperture to be illuminated, said aperture located opposite said light source with respect to said condenser lens, and lying a known distance L from said light source;

wherein said condenser lens has a relative zonal ray height which is greater than or equal to $(0.00122\times L)+0.301$, where L is given in millimeters.

2. The optical illumination system of claim 1 wherein said condenser lens has a minimum diameter of 25 mm.

3. The optical illumination system of claim 1 wherein said condenser lens is located at a position between said aperture and said light source such that a marginal ray from said light source passes through an edge of said condenser lens and intersects said aperture near an extremity thereof.

4. The optical illumination system of claim 1 wherein said aperture has a rectangular shape.

5. The optical illumination system of claim 1 wherein said aperture has a square shape.

6. The optical illumination system of claim 1 wherein said condenser lens is plano-convex.

7. The optical illumination system of claim 1 wherein said condenser lens is a meniscus.

8. The optical illumination system of claim 1 wherein said condenser lens is aspheric.

9. The optical illumination system of claim 4 wherein illumination at a corner of said rectangular aperture is at least 20% of illumination at a center of said rectangular aperture.

10. An overhead projector comprising:

a base;

a light source located in said base;

a condenser lens located in said base, adjacent said light source;

a generally rectangular stage area located on said base, opposite said light source with respect to said condenser lens, and located a known distance L from said light source; and projection means attached to said base, proximate said stage area, for projecting light from said stage area;

wherein said condenser lens has a relative zonal ray height which is greater than or equal to $(0.00115\times L)+0.333$ where L is given in millimeters.

11. The overhead projector of claim 10 wherein said condenser lens has a diameter in the range of 25–100 mm.

12. The overhead projector of claim 10 wherein said condenser lens is located at a position between said stage and said light source such that a marginal ray from said light source passes through an edge of said condenser lens and intersects said stage area near a corner thereof.

13. The overhead projector of claim 10 further comprising means, located adjacent said light source, opposite said condenser lens, for reflecting light from said light source toward said stage area.

14. The overhead projector of claim 10 wherein said stage area has a square shape.

15. The overhead projector of claim 10 wherein said condenser lens is plano-convex.

16. The overhead projector of claim 10 wherein said condenser lens is a meniscus.

17. The overhead projector of claim 10 wherein said condenser lens is aspheric.

18. The overhead projector of claim 10 wherein illumination at a corner of said rectangular stage area is in the range of 20%–30% of illumination at a center of said rectangular stage area.

19. The overhead projector of claim 10 wherein said condenser lens is positioned with respect to said light source such that the collection angle is greater than or equal to 110°.

20. An overhead projector comprising:

a base;

a light source located in said base;

a rectangular stage area located on said base at a known distance L from said light source;

a projection lens attached to said base, proximate said stage area;

a Fresnel lens located at said stage area, for directing light toward said projection lens;

a plano-convex condenser lens having a diameter of at least 25 mm, positioned between said light source and said stage area, in said base, such that a marginal ray from said light source passes through an edge of said condenser lens and intersects said stage area near a corner thereof, said condenser lens having a relative zonal ray height which is greater than or equal to $(0.00109\times L)+0.364$ where L is given in millimeters; and means, located adjacent said light source, opposite said condenser lens, for reflecting light from said light source toward said stage area;

wherein illumination at a corner of said stage area is at least 20% of illumination at a center of said stage area.

* * * * *